Jan. 17, 1956 H. T. LAMBERT ET AL 2,731,114
FLUID-OPERATED BRAKE AND CUSHIONING MEANS THEREFOR
Filed Sept. 15, 1949 3 Sheets-Sheet 1

INVENTORS.
H. T. Lambert
C. R. Myers
J. A. Kershner
BY
Robb & Robb
Attorneys.

Jan. 17, 1956     H. T. LAMBERT ET AL     2,731,114
FLUID-OPERATED BRAKE AND CUSHIONING MEANS THEREFOR
Filed Sept. 15, 1949     3 Sheets-Sheet 2
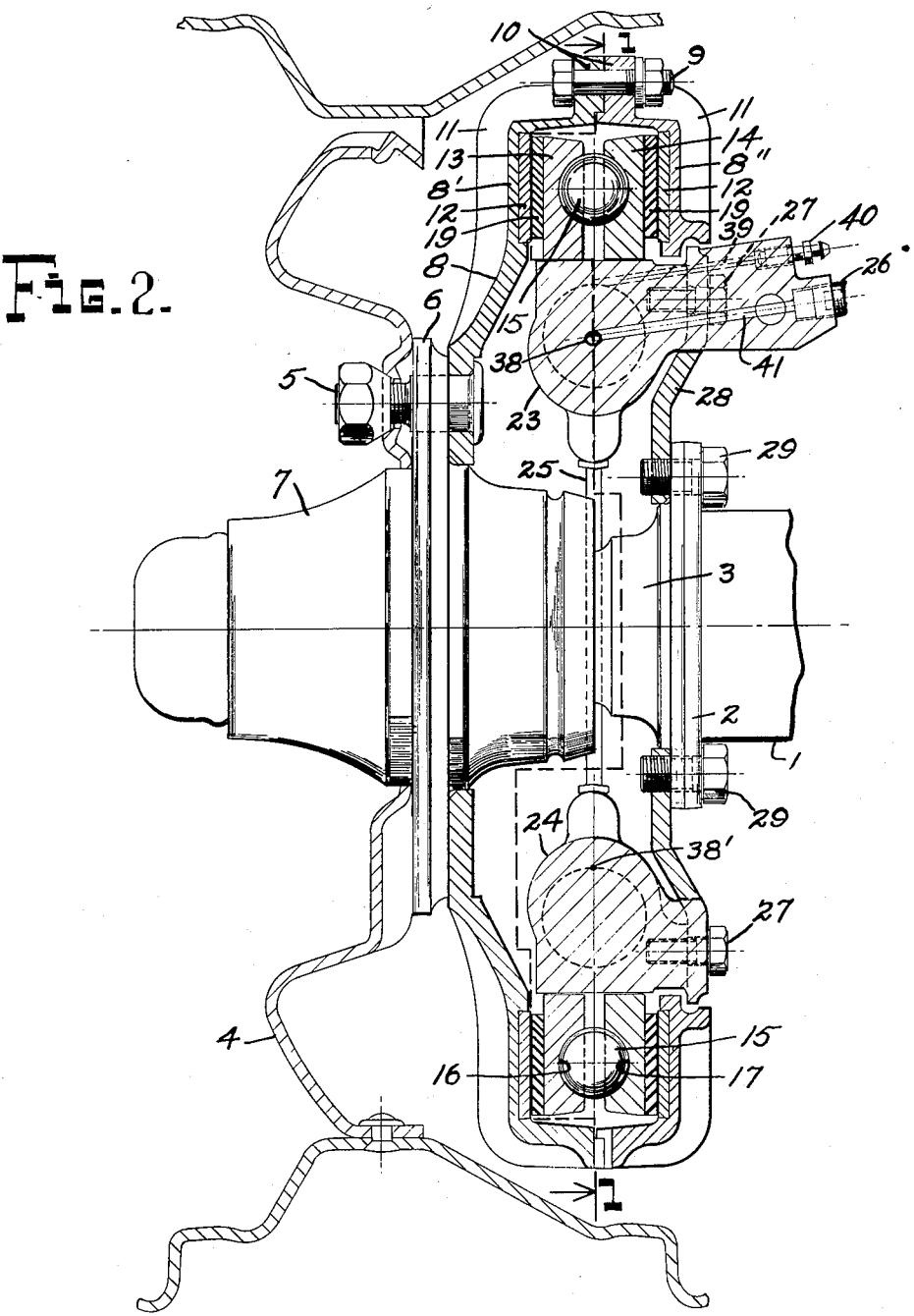

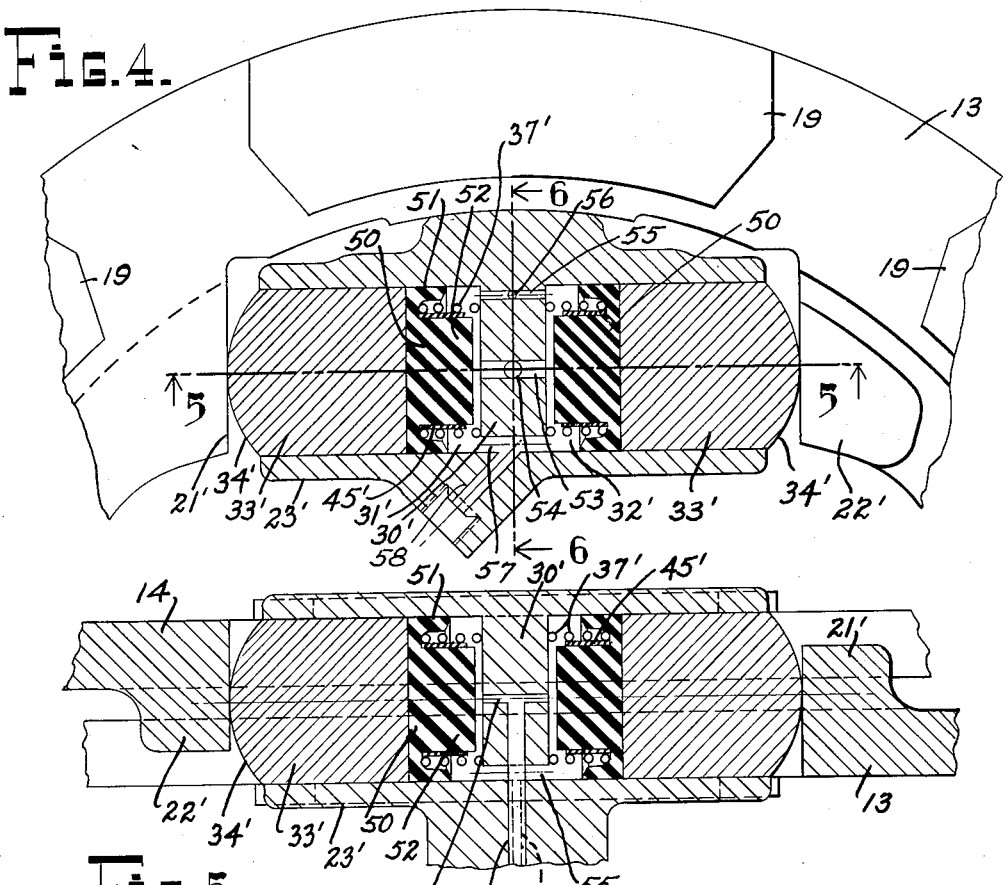
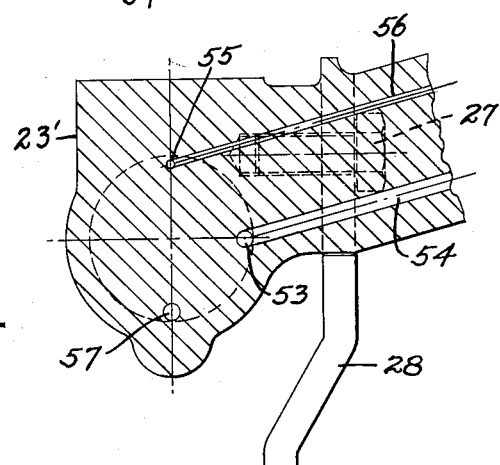

United States Patent Office 2,731,114
Patented Jan. 17, 1956

2,731,114

FLUID-OPERATED BRAKE AND CUSHIONING MEANS THEREFOR

Homer T. Lambert, St. Joseph, Claude R. Myers, Galien, and Osborn A. Kershner, St. Joseph, Mich., assignors, by direct and mesne assignments, to Lambert Brake Corporation, St. Joseph, Mich., a corporation of Michigan Application September 15, 1949, Serial No. 115,922

7 Claims. (Cl. 188—152)

The present invention appertains to further improvements in fluid-operated brakes, more particularly of the hydraulic servo-acting type, and to cushioning means for eliminating noise from such brakes.

One of the principal problems encountered in brakes for automotive vehicles, and especially in brakes for so-called passenger or pleasure automobiles, is the elimination of noises which are usually very pronounced and hence objectionable when the brakes are applied after or during reversal of motion of the vehicle. In some brakes, the noises become even more pronounced as wear of the friction surfaces increases with use.

In the case of disc brakes of the double-disc type, as more particularly disclosed in the prior applications of Lambert and Myers, Serial No. 66,404, filed December 21, 1948; Osborn A. Kershner, Serial No. 109,651, filed August 11, 1949, now Patents #2,595,859 issued May 6, 1952, and #2,575,963 issued November 20, 1951, respectively, and others, one of the two inner discs must be held against rotation as the brake is applied during movement of the vehicle in one direction, while the other disc is free to rotate slightly responsive to the actuators or power cylinders, and also responsive to the servo action which takes place after the initial energization of the brake. However, on reversal of the movement of the vehicle, the other disc must be held against rotation, as the brake is applied, while the first-mentioned disc is left free to rotate slightly. This alternate holding against rotation and release of the respective discs requires the use of stop means of some form, such as studs, the ends of the power cylinders or actuators, or some other suitable abutments which coact with stop lugs on the respective discs, as in the earlier application above referred to, thus creating noises arising from sudden or abrupt metal-to-metal contact between the stop lugs on the discs and the studs, cylinders or other abutments, as the case may be, incident to what is usually termed "clocking" of the inner double-disc assembly in one direction or the other, which occurs as the inner discs engage the housing or other rotating member to be braked. Such noises may be obviated and eliminated by use of a fluid or hydraulic stop, as in the later-filed application above referred to.

The present invention is characterized by the provision of a yieldable cushion which effectively and silently opposes and resists the torque tending to shift or "clock" the brake discs or other friction elements of the brake, as the case may be, in either direction when the brake is applied during motion in alternate directions of the vehicle, or during rotation of any rotatable member to which the brake is applied.

Another object of the invention is to provide a novel and improved brake cushion having the form of a resilient buffer which is operatively interposed between each friction member or brake disc and the actuator or power cylinder so as to silently cushion the clocking movements of the discs or other friction members against the cylinder.

A further object of the invention is to provide a combined resilient buffer and fluid cushion for silently cushioning the clocking movements of the brake discs or other friction members, the fluid cushion acting momentarily at least before action of the resilient buffer to lessen the impacts on the latter and thus prolong the life thereof.

A still further object of the invention is to provide an improved fluid-operated power cylinder and piston assembly for brakes and other purposes, wherein any thrusts imposed against the piston tending to move the piston inwardly of the cylinder, will be effectively limited and silently cushioned.

Other and further objects and advantages of the invention will be hereinafter described and the novel features thereof defined in the appended claims.

In the drawings:

Figure 1 is a view, partly in section and partly in elevation, and representing a section taken on the line 1—1 of Figure 2, showing a double-disc brake constructed in accordance with the present invention and as more particularly applicable to automotive vehicles, said brake embodying opposed sets of double-acting power cylinders or actuators, one of which is shown in section, and one side of the rotatable brake housing or casing being removed so as to expose the interior of the brake assembly;

Figure 2 is a sectional view taken through the complete brake assembly and associated vehicle wheel, with the section taken on the plane of the lines 2—2 of Figure 1, and certain of the parts of this view being shown in elevation;

Figure 4 is an enlarged fragmentary view, partly in section and partly in elevation, showing a modified power cylinder or actuator construction embodying a modified form of brake cushioning means, the cylinder or actuator of this view being the upper cylinder;

Figure 5 is a horizontal sectional view as taken on the line 5—5 of Figure 4; and Figure 6 is a vertical sectional view taken on the line 6—6 of Figure 4.

Like reference characters designate corresponding parts in the several figures of the drawings, from which it will be understood that although the brake construction is represented in a form which is more particularly applicable to automotive vehicles, it is not confined thereto.

Figure 1:
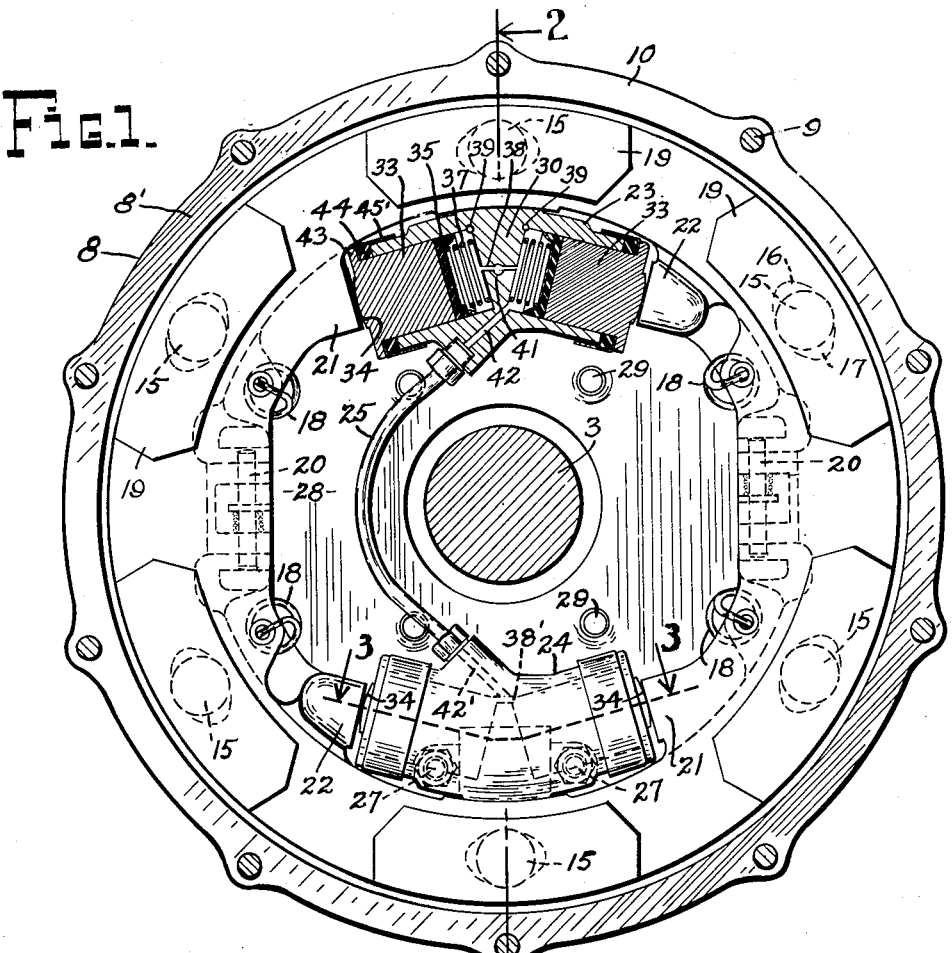
Figure 3:
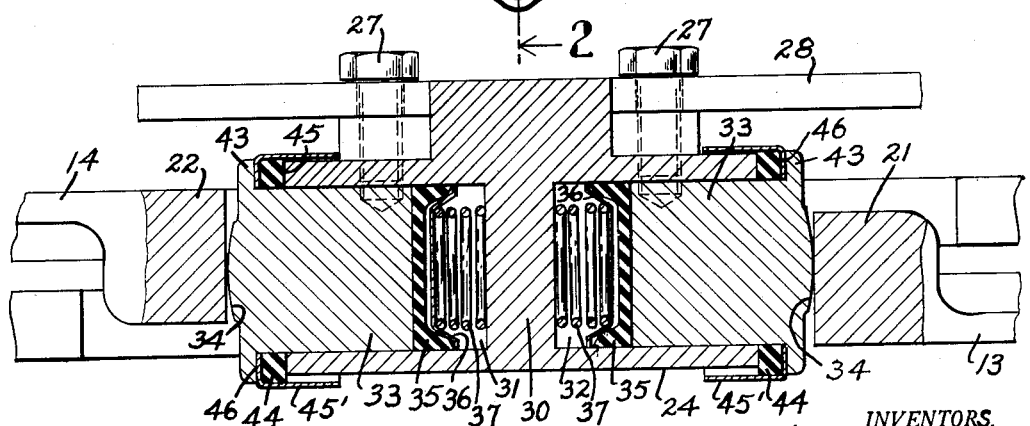
Figure 3 is an enlarged fragmentary sectional view taken on the line 3—3 of Figure 1 through the lower power cylinder or actuator and certain of the other parts of the brake assembly, with the brake housing omitted.

Referring first to Figures 1 to 3 of the drawings, 1 generally denotes a conventional wheel mounting of an automotive vehicle, said mounting being provided with an annular flange 2. At the outboard side of the mounting 1 and flange 2 is extended an axle 3 on which the wheel 4 is mounted, the wheel being suitably attached, as by bolts 5, to the radially extended flange 6 of a hub 7 as is conventional in certain makes of automotive vehicles.

Also attached to the flange 6 of the hub 7 is a brake housing or casing, generally indicated at 8, which constitutes the rotary member to be braked, said casing or housing being rotatable with the wheel 4. The casing or housing is preferably made in two parts, one of which is designated 8', and the other of which is designated 8", the two housing sections being suitably secured together as by means of a plurality of bolts or screws 9 extended through the abutting marginal flanges 10 at circumferentially spaced points about the housing. The outer faces of the housing sections 8', 8" are each provided with cooling fins or ribs 11, as is customary in such brake constructions, said fins or ribs aiding in dissipating the heat generated in the brake during braking action.

On the inner faces of the respective housing sections 8', 8", there are formed annular braking surfaces which are arranged in opposed, axially spaced relation to each other, said braking surfaces being preferably lined with suitable friction material as indicated at 12, 12.

Disposed within the housing or casing 8 is a double-disc assembly or unit which is composed essentially of two flat pressure plates or disc members respectively designated 13 and 14, the disc 13 being the outboard disc, and the disc 14 being the inboard disc. Arranged between the discs 13, 14 is a plurality of balls 15 seating in small sockets or seats 16 and 17 in the respective inner faces of the discs, the sockets or seats being oppositely inclined so as to provide camming ramps which act to force the discs 13 and 14 apart and into contact with the braking surfaces of the housing 8 responsive to slight relative rotation of the discs 13, 14. The discs are yieldingly connected together by a plurality of springs 18 which serve to normally yieldingly urge the discs towards each other, and at the same time normally urging the discs rotatively relative to each other so that the balls tend to assume a position in the deepest part of the respective seats 16, 17 which are opposed to each other in axially spaced relation.

The outer faces of the discs 13, 14 preferably have segments of friction lining material suitably secured thereto, as indicated at 19, said lining material being of appropriate thickness to allow a substantial range of wear during long use of the brake, without damaging the brake. These lining segments 19 are arranged in opposed relation to the linings 12 on the housing 8, so that when the discs 13, 14 are axially spread apart by the camming action of the balls 15, a powerful braking action is exerted upon the housing 8, with consequent braking of the wheel 4 which rotates with the housing. Motion of the vehicle accelerates the braking action after the initial braking engagement is made between the discs 13, 14 and the housing 8, this acceleration being customarily known as a servo action.

In order to compensate for wear of the friction linings, and to maintain a constant running or release clearance between the friction surfaces of the brake, the discs 13, 14 may be provided with suitable automatic adjusters, as indicated in broken lines in Figure 1, and generally designated 20. The adjuster need not be further described herein since the same forms no part of the present invention.

In order to support the inner double-disc assembly concentrically within the brake housing 8, and to cause slight rotative movements of the discs 13, 14 relative to each other, as well as allow relative axial movements of the discs, each disc is provided with a pair of lugs or bosses arranged at diametrically opposite points and extended from the inner periphery of the discs, the lugs or bosses on the disc 13 being indicated at 21, 21, and those on the disc 14 being designated 22, 22. These lugs or bosses are so arranged and formed that when the discs 13, 14 are assembled together, with the balls 15 therebetween, one of the lugs 21 will be aligned with one of the lugs 22, but substantially spaced therefrom, at the upper side of the assembly, while the other lug 21 will be aligned with the other lug 22 and substantially spaced therefrom, at the lower side of the assembly, as more particularly shown in Figure 1 of the drawings. Between each pair of opposed lugs 21, 22 is mounted a wheel cylinder or fluid-operated actuator, the cylinder 23 generally indicating the upper cylinder or actuator, and the cylinder 24 generally indicating the lower cylinder or actuator. The two cylinders or actuators 23, 24 are connected together by a pipe or tube 25 to establish pressure fluid communication therebetween, and one of said cylinders, preferably the upper cylinder 23, is connected at the back thereof with the fluid line 26 of the usual hydraulic brake system of the vehicle, said system including the usual master cylinder (not shown) which is operated by a brake pedal in the conventional manner to apply and release the brakes.

Both cylinders or actuators 23, 24 are fixedly mounted in any suitable manner, as by bolting the same by bolts 27 to a stationary backing plate or adapter plate 28, which in turn is fixed in any suitable manner, as by means of bolts 29, to the wheel mounting flange 2 previously referred to. The backing plate 28 lies at the inboard side of the brake assembly and extends into close proximity to the inner marginal edge of the inboard housing section 8″ so as to effectively close the housing 8 against the entrance of mud, water and other foreign matter which might otherwise splash in the brake during travel of the vehicle.

As will be best understood from reference to Figures 1 and 3, the two cylinders or actuators 23 and 24 are generally similar to each other and are preferably of the double-acting type. That is to say, each of the cylinders 23, 24 is provided with a transversely extended partition 30 located about midway of its length and defining at opposite sides thereof two piston chambers respectively designated 31, 32. Slidably mounted in each piston chamber 31, 32 is a piston 33, each piston extending to the outer end of the cylinder and somewhat beyond the same, with the extreme outer face of the piston rounded or curved as indicated at 34 so as to present minimum contact with the lugs 21 and 22 on the respective discs 13, 14 of the inner disc assembly. Thus, in the case of the upper cylinder or actuator 23 in Figure 1, the curved end 34 of the piston 33 at the left-hand end of the cylinder abuts against the lug 21 on the disc 13, while the curved end of the other piston at the opposite end of this cylinder abuts against the lug 22 on the other disc 14. In the case of the lower cylinder or actuator 24, the piston in the lefthand end of the cylinder abuts against the lug 22 on the disc 14, which is diametrically opposite the other lug 22 coacting with the upper cylinder, while the piston at the right-hand end of the cylinder 24 abuts against the lug 21 on disc 13 which is diametrically opposite the other lug 21 which coacts with the upper cylinder.

Disposed in the respective piston chambers 31, 32 and located behind the respective pistons 33 in these chambers is a rubber or other flexible sealing cup 35. Seated in each sealing cup is a thin metal expander 36, against which one end of a coil spring 37 is seated, the opposite end of the coil spring seating against the central partition 30. The spring serves to normally yieldingly urge both the expander and the flexible sealing cup 35 against the inner end of the piston 33, while both the sealing cup and the expander are free to move inwardly and outwardly of the piston chamber along with the corresponding movements of the piston.

The partition 30 of each of the cylinders or actuators is provided with an axially extended fluid passage establishing communication between the two piston chambers 31, 32 on opposite sides of the same, this passage being designated 38 in the case of the upper cylinder and being located substantially centrally of the partition 30, and being designated 38′ in the case of the lower wheel cylinder and being located through the upper portion of the partition so as to permit bleeding of air from both cylinders through two bleed passages designated 39, 39 in the upper cylinder. As best shown in Figure 1, the two bleed passages 39, 39 are located at the extreme inner ends of the piston chambers and at the highest point thereof, and lead rearwardly through the cylinder to the back thereof where they are fitted with the usual adjustable bleed valves 40. Pressure fluid is admitted to the wheel cylinders from the fluid line 26 through a passage 41 leading through the partition 30 of the upper cylinder 23 and communicating at its inner end with the passage 38 which leads into the two piston chambers of this cylinder. From one of the piston chambers is extended a passage 42 which communicates with one end of the connecting pipe or tube 25 so that the pressure fluid will fill and act upon both wheel cylinders, the opposite end of the pipe or tube 25 communicating with a corresponding passage 42′ in the lower wheel cylinder, and the latter passage in turn communicating with the passage 38′.

When the brake is in a released condition, the fluid lines of the brake system, together with the wheel cylinders 23 and 24 are normally filled with fluid which is trapped in the lines and cylinders by the action of the master cylinder so as to maintain some residual pressure in the system, usually a few pounds, so that the pistons of both cylinders will normally be held in engagement with the lugs or bosses 21 and 22 on the respective discs 13 and 14 of the inner disc assembly. However, this pressure is insufficient to overcome the tension of the springs 18 which normally yieldingly urge the discs 13 and 14 towards each other and away from the friction surfaces of the rotary brake housing 8. However, on actuation of the master cylinder by operation of the usual brake pedal, the pressure fluid in the lines connected with the wheel cylinders, and in the cylinders themselves, is subjected to increased pressure which acts to force the pistons outwardly of the respective wheel cylinders, in opposite directions, thereby exerting a thrust upon the lugs 21 and 22 tending to shift the discs 13 and 14 rotatively relative to each other in opposite directions, thereby causing the camming balls 15 to climb the ramp portions of the respective recesses 16 and 17, with consequent spreading of the discs apart and into engagement with the rotary brake housing 8. This initial engagement would ordinarily tend to "clock" the inner disc assembly in the same direction as the direction of rotation of the brake housing, when the vehicle is in motion, so that it is necessary to hold one of the inner discs, preferably the inboard disc 14, relatively stationary, while leaving the other disc 13 free to rotate slightly relative to the inboard discs, so that on continuation of the pressure of the pressure fluid acting upon the wheel cylinders, together with the rotative drag or torque imparted by the housing to the outboard disc, the spreading action of the discs apart will continue to that extent sufficient to produce a powerful braking action upon the housing 8, and consequently upon the wheel 4.

According to the present invention, and assuming the brake housing 8 and the wheel 4 are rotating in a counter-clockwise direction, as viewed in Figure 1, the drag torque on initial engagement of the inner disc assembly with the housing will likewise be in a counter-clockwise direction, tending to "clock" the inner disc assembly counter-clockwise, thereby causing the lugs 22 on the inboard disc 14 to push against the pistons at the corresponding ends of both the upper and lower wheel cylinders 23, 24, inwardly until the inward movement of these pistons is stopped in some suitable manner, while at the same time the pressure fluid acts to force the pistons at the opposite ends of the respective wheel cylinders in an outward direction and against the lugs 21 until the disc 13 has rotated a sufficient amount relative to the disc 14, with consequent camming of the discs apart by the action of the balls 15, until the required braking engagement of both discs with the housing 8 is attained.

On reversal of the motion of the vehicle, with corresponding reversal of the direction of rotation of the wheel 4 and brake housing 8, the inner disc assembly will "clock" in the opposite direction, that is, in a clockwise direction as viewed in Figure 1, until the outboard disc 13 is stopped by an appropriate stop and becomes the relatively stationary disc, while the inboard disc 14 is left free to rotatively shift in a clockwise direction until the discs spread apart sufficiently to fully engage the housing 8 with the required braking force.

According to the present invention, the wheel cylinders 23, 24 are utilized as the stop means for limiting the clocking action of the inner disc assembly and for holding one of the inner discs relatively stationary while the other inner disc is free to shift both rotatively and axially relative to the stationary disc during braking applications. As will be observed from reference to Figures 1 and 3 of the drawings, each of the pistons 33 is provided at its extreme outer end with a radially extended annular flange 43 which overlies the extreme end of the cylinder. These flanges 43 therefore constitute stop flanges and limit inward movement of the pistons 33 into the wheel cylinders or actuators, but if said flanges were allowed to have metal-to-metal contact with the cylinders, or with some other stop, objectionable noises would be created in the brake during each brake application, and particularly during or following reversal of the direction of travel of the vehicle. Accordingly, cushioning means are provided to cushion the brake action and thus eliminate noises from the brake. These cushioning means include an annular ring of rubber or other resilient material, designated 44, interposed between the annular flange 43 of each piston 33 and the adjacent extreme end 45 of the cylinder. The ring 44 preferably fits snugly about the piston so as to move therewith towards and away from the adjacent end of the cylinder responsive to inward and outward movements of the piston 33. In order to reduce and minimize radial distortion of the ring 44, with consequent destruction or damage thereof under repeated cushioning actions, the resilient ring 44 is preferably confined within a metallic or other rigid sleeve 45′ which embraces the same, and which is preferably also axially extended to loosely fit about the adjacent end of the cylinder so as to form a dust cover which minimizes entrance of foreign matter into the cylinder or around the piston. The outer end of the sleeve 45′ is extended radially inwardly to form an annular flange 46 which fits snugly about the piston 33 between the resilient ring 44 and the annular flange 43 on the extreme outer end of the piston.

To still further cushion the inward movements of the pistons 33 in the respective wheel cylinders or actuators 23, 24, a fluid cushion is also preferably provided, said fluid cushion coacting with the resilient cushioning rings 44 to relieve the latter of sudden or abrupt impacts which would otherwise result when the pistons approach the end of their inward movements and cause the resilient cushions 44 to engage the adjacent ends of the cylinders. By the use of such fluid cushions, the effective life and cushioning action of the resilient cushions or buffers 44 are substantially prolonged without necessitating repair or replacement of the resilient cushioning members 44.

The fluid cushion above referred to is attained by making the passages 38 and 38′ in the respective wheel cylinders or actuators 23, 24, of very small diameter, such as on the order of one-sixteenth inch or less. Notwithstanding the restricted or constricted size of the passages 38, 38′, the passages are of ample size to freely admit the pressure fluid into the piston chambers 31, 32 behind the opposed pistons for causing outward movement of the pistons during brake applications, which movement is only very small under ordinary circumstances in brake constructions of this type to effectively apply the brake, yet on any inward movement of the pistons, the restricted passages 38, 38′ produce a momentary dashpot effect, and the return flow of the pressure fluid is momentarily retarded before the resilient cushioning members 44 strike the corresponding ends of the cylinders. Thus, the fluid cushioning action contributes to the cushioning effect of the resilient cushions 44 and relieves the latter of sudden or abrupt impacts, thereby prolonging the life of the resilient cushions.

The cushioning actions described in the foregoing occur whenever there is any tendency of the inner disc assembly to "clock" or shift rotatively in either direction during braking applications, with the result that one of the two pistons of both the upper and lower wheel cylinders or actuators 23, 24 moves inwardly until its movement is arrested by the cushioning action attending engagement of the resilient cushions 44 with the corresponding ends of the cylinders, while at the same time, the other two pistons in the respective cylinders or actuators 23, 24 are free to move outwardly for the purpose of causing slight relative rotation of the inner discs 13, 14, with consequent axial separation of the discs into braking engagement with the rotary housing 8. By reason of the provision of the curved or rounded surfaces 34 on the extreme outer faces of the pistons 33, frictional contact between the pistons and the lugs 21, 22 on the respective discs 13, 14 is reduced to a minimum in every position of the discs 13, 14 during relative rotative and axial movements thereof. Consequently, the discs 13, 14 are always free to move both axially and rotatively relative to each other without appreciable frictional resistance against the pistons which concentrically support the inner disc assembly within the rotary housing 8.

The curved or rounded faces 34 on the extreme outer ends of the pistons 33 have the further advantage of facilitating mounting of the inner disc assembly in the brake housing 8, or removal thereof from the brake housing for purposes of repair or replacement as may be required after long use and the friction linings have become worn out. As will be obvious from reference to Figures 1 and 2, access to the inner disc assembly of the brake may be readily attained by first removing the wheel 4 from the hub 7, after which the bolts or screws 9 around the housing 8 may then be removed and the outboard section of the housing, together with the hub 7, may be freely displaced from the axle 3. This leaves the inner disc assembly fully exposed, and the inner disc assembly may then be removed as a unit by sliding the same outwardly to disengage the lugs 21, 22 from the pistons 33 of the wheel cylinders or actuators 23, 24.

After replacement of the lining segments 19 on the inner disc assembly, or on substitution of a complete replacement inner disc assembly, the inner disc assembly may be restored to an assembled position by sliding the same axially inwardly to engage the lugs 21, 22 over the outer ends of the pistons 33 of the cylinders or actuators 23, 24. The inner disc assembly will readily slip into place and will automatically centralize itself in a floating position on the pistons, after which the wheel hub 7 with the outboard housing section 8' attached thereto may be readily re-mounted on the axle 3 and the bolts or screws 9 restored to clamp the housing section 8' to the housing section 8", thereby completing the brake assembly. Thereafter, the wheel 4 may be re-mounted on the hub 7. Such a construction is characterized by its extreme simplicity and the ease of assembly and/or repair. Motor vehicle fleets equipped with brakes constructed in accordance with the present invention will attain the maximum advantages of effective and powerful brake actions, free from objectionable noises in the brakes, while at the same time the time lost for purposes of servicing or repairing the brakes is reduced to an absolute minimum.

In Figures 4 to 6 of the drawings, there has been shown a modified wheel cylinder or actuator construction embodying a slightly different form of cushioning means, in which the resilient cushion is located wholly interiorly of the cylinder, instead of exteriorly as in Figures 1 to 3. Only the upper wheel cylinder designated 23' is shown in Figures 4 to 6, but it will be understood that a similar wheel cylinder or actuator is associated therewith and connected thereto in fluid communication at the diametrically opposite side of the brake assembly, just as in Figures 1 to 3.

According to the modified construction shown in Figures 4 to 6, the two opposed pistons are designated 33', 33', and each piston is provided with a curved or rounded surface 34' at its extreme outer end for engagement with the lugs 22' and 21', respectively, on the discs 13 and 14 of the inner disc assembly. Behind each piston in the respective piston chambers 31', 32' is a combined resilient sealing cup and resilient cushioning member or buffer of rubber or other suitable resilient material. The combined sealing cup and resilient cushion is designated 50, and includes an annularly cupped flange 51 which engages the outer wall of the piston chamber. The central portion of the sealing cup is axially extended inwardly, as at 52, and beyond the rear lip of the sealing flange 51, said extended portion forming a resilient cushion between the piston 33 and the central partition 30' of the wheel cylinder 23'. A rigid metal or other confining sleeve or ring 45' encircles the cushioning portion 52 to restrain the same against undue radial distortion. A coil spring 37' encircles the cushion member 52 exteriorly of the sleeve 45' and abuts at one end against the partition 30', while seating at its other end within the sealing cup flange 51.

The cushioning action of the combined sealing cup and cushion member just described is generally similar to that described in connection with Figures 1 to 3, and the cushioning member 50 is free to move inwardly and outwardly with the piston 33' as the piston moves responsive to pressure fluid. As the piston approaches the end of its inward movement, the cushion portion 52 will engage the partition 30' with a cushioning action absorbing and fully silencing any noise such as would otherwise occur by metal-to-metal contact of the piston with the partition 30', or with some other stop.

Associated with the resilient cushion 50 is a fluid cushion which is attained by the utilization of a constricted or exceedingly small fluid passage 53 extending axially through the partition 30' near the outer edge thereof and in a position which will not be obstructed by the cushion portion 52 when the latter engages the partition. This restricted passage 53 establishes communication between the respective piston chambers 31', 32', and is also in communication with a passage 54 leading rearwardly from the cylinder 33' and adapted to be connected at its rear end to the fluid line of the hydraulic brake system. The partition 30' is also preferably provided with an axially extended bleed passage 55 intercommunicating with the two piston chambers 31', 32', and communicating with a rearwardly extended bleed passage 56 terminating at the back of the wheel cylinder and adapted to receive a bleed valve like the valve 40 in Figure 2. A still further axially extended passage 57 is provided through the partition 30', which is in communication with a branch passage 58 which leads downwardly from the bottom of the wheel cylinder for connection with the usual interconnecting pipe or tube 25, as in Figure 1, to establish fluid connection between the upper and the lower wheel cylinders of the complete brake assembly.

The construction and operation of the modified arrangement illustrated in Figures 4 to 6 will be obvious from the foregoing and hence need not be further elaborated upon.

While the specific details have been herein shown and described, the invention is not confined thereto as changes and alterations may be made without departing from the spirit thereof as defined in the appended claims.

We claim:

1. A fluid-operated power device, comprising a cylinder having a fluid inlet, a piston axially movable therein, said piston being extended from one end of said cylinder and provided with a radially extended annular flange overlapping the adjacent end of said cylinder, an annular cushioning member of resilient material surrounding the extended end of said piston between its annular flange aforesaid and the adjacent end of said cylinder for limiting and yieldably cushioning inward movement of said piston, and a seal carried by said piston in overlying relation to said cushion member and the adjacent end of said cylinder.

2. A fluid-operated power device, comprising a cylinder having a fluid inlet, a piston axially movable therein, said piston being extended from one end of said cylinder and provided with a radially extended annular flange overlapping the adjacent end of said cylinder, and an annular cushioning member of resilient material surrounding the extended end of said piston between its annular flange aforesaid and the adjacent end of said cylinder for limiting and yieldably cushioning inward movement of said piston, said annular cushioning member being connected to and carried by said piston and movable therewith towards and away from the adjacent end of said cylinder.

3. A fluid-operated power device, comprising a cylinder having a fluid inlet, a piston axially movable therein, said piston being extended from one end of said cylinder and provided with a radially extended annular flange overlapping the adjacent end of said cylinder, and an annular cushioning member of resilient material surrounding the extended end of said piston between its annular flange aforesaid and the adjacent end of said cylinder for limiting and yieldably cushioning inward movement of said piston, and means exteriorly embracing said cushioning member for annularly confining the same, said last-mentioned means comprising a seal carried by said piston and overlying the adjacent end of said cylinder exteriorly thereof.

4. A fluid-operated power device, comprising a cylinder having a fluid inlet, a piston axially movable therein responsive to fluid pressure, and a cushion member of resilient material disposed behind said piston within said cylinder for limiting and yieldably cushioning inward movement of said piston, said cushion member including an axially extended body of resilient material adapted to abut against the inner end of said cylinder as the piston approaches the end of its inward movement in the cylinder, and annular means carried by and encircling said cushion member and rigidly confining said body against radial distortion.

5. A fluid-operated power device, comprising a cylinder having a fluid inlet, a piston axially movable therein responsive to fluid pressure, and a cushion member of resilient material disposed behind said piston within said cylinder for limiting and yieldably cushioning inward movement of said piston, said cushion member including an axially extended body of resilient material adapted to abut against the inner end of said cylinder as the piston approaches the end of its inward movement in the cylinder, and annular means carried by said cushion member and encircling said body and rigidly confining the same against radial distortion.

6. A fluid-operated power device, comprising a cylinder having a fluid inlet, a piston axially movable therein responsive to fluid pressure, said cylinder and piston each having an abutment, a cushion member of resilient material disposed between said abutments for limiting and yieldably cushioning inward movement of said piston, and annular means carried by and encircling said cushion member and rigidly confining the same against radial distortion.

7. In a brake of the class described, including a rotary housing adapted to be connected to a rotary member to be braked, an inner double-disc assembly concentrically disposed within said housing, with the discs free to move both rotatively and axially relative to each other, camming means between said discs of the inner disc assembly for spreading said discs axially apart and into frictional engagement with the rotary housing responsive to relative rotative movements of said discs, and fluid-operated actuator means for imparting relative rotative movements to said discs, said actuator means including a pair of double-acting cylinders disposed in diametrically opposite relation to each other and each cylinder having oposed pistons axially movable therein responsive to fluid pressure, that improvement wherein each of said cylinders is provided with a resilient cushioning member interposed between the inner end of the piston therein and the inner end of said cylinder, said cushioning member comprising an axially extended body of resilient material adapted to abut against the inner end of said cylinder as the piston approaches the end of its inward movement in the cylinder, for limiting and yieldably cushioning inward movement of said piston responsive to torque imposed on the discs aforesaid during frictional engagement thereof with the rotary housing, and said body having an integral radially extended annular cupped sealing flange formed on its end next to the piston and forming a fluid-tight seal against the inner wall of said cylinder.

References Cited in the file of this patent

UNITED STATES PATENTS

| | | |
|---|---|---|
| 1,463,654 | McNulty | July 31, 1923 |
| 1,513,217 | Bunker | Oct. 28, 1924 |
| 1,962,406 | Pentz | June 12, 1934 |
| 2,261,962 | Christenson | Nov. 11, 1941 |
| 2,312,363 | Sawtelle | Mar. 2, 1943 |
| 2,314,444 | Crittenden | Mar. 23, 1943 |
| 2,322,121 | Frank | June 15, 1943 |
| 2,336,352 | Goepfrich | Dec. 7, 1943 |
| 2,344,690 | Freer | Mar. 21, 1944 |
| 2,345,107 | Goepfrich | Mar. 28, 1944 |
| 2,346,480 | Freer | Apr. 11, 1944 |
| 2,571,486 | Reynolds | Oct. 16, 1951 |
| 2,575,963 | Kershner | Nov. 20, 1951 |
| 2,595,859 | Lambert et al. | May 6, 1952 |
| 2,598,609 | Samuel | May 27, 1952 |

FOREIGN PATENTS

| | | |
|---|---|---|
| 467,431 | Great Britain | June 16, 1937 |